US011112845B2

(12) United States Patent
Shih et al.

(10) Patent No.: US 11,112,845 B2
(45) Date of Patent: Sep. 7, 2021

(54) PROBABILISTIC FRAMEWORK FOR COMPILER OPTIMIZATION WITH MULTITHREAD POWER-GATING CONTROLS

(71) Applicants: National Taiwan University, Taipei (TW); MEDIATEK INC., Hsin-Chu (TW)

(72) Inventors: Wen-Li Shih, Taipei (TW); Jenq-Kuen Lee, Hsinchu (TW); Cheng-Yen Lin, Chiayi County (TW); Ming-Yu Hung, Nantou County (TW)

(73) Assignees: National Taiwan University, Taipei (TW); MFDIATEK INC., Hsin-Chu (TW)

( * ) Notice: Subject to any disclaimer, the term of this patent is extended or adjusted under 35 U.S.C. 154(b) by 0 days.

(21) Appl. No.: 14/964,592

(22) Filed: Dec. 10, 2015

(65) Prior Publication Data

US 2016/0378444 A1    Dec. 29, 2016

Related U.S. Application Data

(60) Provisional application No. 62/183,757, filed on Jun. 24, 2015.

(51) Int. Cl.
*G06F 1/28*     (2006.01)
*G06F 8/41*     (2018.01)

(52) U.S. Cl.
CPC ............. *G06F 1/28* (2013.01); *G06F 8/4432* (2013.01); *Y02D 10/00* (2018.01)

(58) Field of Classification Search
CPC ......... G06F 1/32–3296; G06F 8/00–78; G06F 1/329–3296; G06F 8/4432; G06F 1/3234–3296; G06F 1/28; Y02D 10/00
See application file for complete search history.

(56) References Cited

U.S. PATENT DOCUMENTS

2003/0014742 A1* 1/2003 Seth ........................ G06F 8/443
717/158
2006/0277509 A1* 12/2006 Tung ................... G06F 17/5022
716/109

(Continued)

OTHER PUBLICATIONS

Corbet, "Counting on the time stamp counter", Posted Nov. 13, 2006. https://lwn.net/Articles/209101/. Retrieved Jul. 8, 2019 (Year: 2006).*

(Continued)

*Primary Examiner* — Doon Y Chow
*Assistant Examiner* — Joanne G Macasiano
(74) *Attorney, Agent, or Firm* — Winston Hsu

(57) ABSTRACT

A probabilistic framework for compiler optimization with multithread power-gating controls includes scheduling all thread fragments of a multithread computer code with the estimated execution time, logging all time stamps of events, and sorting and unifying the logged time stamps. Time slices are constructed using adjacent time stamps of each thread fragment. A power-gating time having a component turned off for each time slice is determined. Power-gateable windows that reduce energy consumption of the time slice is determined according to the power-gating time. The compiler inserts predicated power-gating instructions at locations corresponding to the selected power-gateable windows into the power-gateable computer code.

9 Claims, 11 Drawing Sheets

(56) References Cited

U.S. PATENT DOCUMENTS

| | | | | |
|---|---|---|---|---|
| 2008/0256376 | A1* | 10/2008 | You | G06F 1/3203 |
| | | | | 713/324 |
| 2009/0146734 | A1* | 6/2009 | Fallah | H03K 19/0019 |
| | | | | 327/544 |
| 2011/0067015 | A1* | 3/2011 | Takagi | G06F 8/456 |
| | | | | 717/149 |
| 2011/0291748 | A1* | 12/2011 | Li | G06F 1/3228 |
| | | | | 327/544 |
| 2015/0370311 | A1* | 12/2015 | Eckert | G06F 1/3228 |
| | | | | 713/323 |
| 2016/0259667 | A1* | 9/2016 | Bailey | G06F 9/505 |

OTHER PUBLICATIONS

Lungu, Anita, et al. "Dynamic power gating with quality guarantees." Proceedings of the 2009 ACM/IEEE international symposium on Low power electronics and design. 2009. (Year: 2009).*

Park, Danbee, et al. "Optimal algorithm for profile-based power gating: A compiler technique for reducing leakage on execution units in microprocessors." 2010 IEEE/ACM International Conference on Computer-Aided Design (ICCAD). IEEE, 2010. (Year: 2010).*

Kondo, Masaaki, et al. "Design and evaluation of fine-grained power-gating for embedded microprocessors." 2014 Design, Automation & Test in Europe Conference & Exhibition (DATE). IEEE, 2014. (Year: 2014).*

* cited by examiner $$\mathcal{P}(st_1, c) = \mathrm{EPT}(pw_1, c) / \mathrm{EET}(tf_1)$$

$$\mathcal{P}(st_2, c) = \frac{\mathrm{EPT}(pw_2, c)}{\mathrm{EET}(tf_2)} \times \frac{0}{\mathrm{EET}(tf_3)}$$

$$\mathcal{P}(st_3, c) = \mathrm{EPT}(pw_2, c) / \mathrm{EET}(tf_2)$$

$$\mathcal{P}(st_4, c) = \frac{\mathrm{EPT}(pw_3, c) + \mathrm{EPT}(pw_5, c)}{\mathrm{EET}(tf_5)} \times \frac{\mathrm{EPT}(pw_4, c)}{\mathrm{EET}(tf_4)}$$

$$\mathcal{P}(st_5, c) = \frac{\mathrm{EPT}(pw_3, c) + \mathrm{EPT}(pw_5, c)}{\mathrm{EET}(tf_5)} \times \frac{\mathrm{EPT}(pw_6, c)}{\mathrm{EET}(tf_6)} \times \frac{\mathrm{EPT}(pw_7, c)}{\mathrm{EET}(tf_7)}$$

$$\mathcal{P}(st_6, c) = \frac{\mathrm{EPT}(pw_8, c)}{\mathrm{EET}(tf_7)} \times \frac{\mathrm{EPT}(pw_6, c)}{\mathrm{EET}(tf_6)}$$

$$\mathcal{P}(st_7, c) = \frac{\mathrm{EPT}(pw_8, c)}{\mathrm{EET}(tf_7)} \times \frac{\mathrm{EPT}(pw_7, c)}{\mathrm{EET}(tf_9)} \times \frac{\mathrm{EPT}(pw_9, c)}{\mathrm{EET}(tf_8)}$$

$$\mathcal{P}(st_8, c) = \mathrm{EPT}(pw_8, c) / \mathrm{EET}(tf_7)$$

The turned-off probability estimation for slice time

FIG. 5C $$T_{pgc}(st_1) = T_{pgc}(tf_1)$$

$$T_{pgc}(st_2) = T_{pgc}(tf_3)$$

$$T_{pgc}(st_3) = T_{pgc}(tf_2) - T_{pgc}(tf_3)$$

$$T_{pgc}(st_4) = T_{pgc}(tf_4)$$

$$T_{pgc}(st_5) = T_{pgc}(tf_5) - T_{pgc}(tf_4)$$

$$T_{pgc}(st_6) = T_{pgc}(tf_4) + T_{pgc}(tf_6) - T_{pgc}(tf_5)$$

$$T_{pgc}(st_7) = T_{pgc}(tf_9) - T_{pgc}(tf_6)$$

$$T_{pgc}(st_8) = T_{pgc}(tf_7) - T_{pgc}(tf_8)$$

The estimated execution time for sliced time

FIG. 5D $$\mathbb{T}_{pgc}(M) = \mathbb{T}_{pgc}(st_1) + \mathbb{T}_{pgc}(st_2) + \mathbb{T}_{pgc}(st_3) + \mathbb{T}_{pgc}(st_4)$$
$$+ \mathbb{T}_{pgc}(st_5) + \mathbb{T}_{pgc}(st_6) + \mathbb{T}_{pgc}(st_7) + \mathbb{T}_{pgc}(st_8)$$

$$\mathbb{T}_{epw}(M, c) = \mathbb{T}_{epw}(st_1, c) + \mathbb{T}_{epw}(st_2, c) + \mathbb{T}_{epw}(st_3, c) + \mathbb{T}_{epw}(st_4, c)$$
$$+ \mathbb{T}_{epw}(st_5, c) + \mathbb{T}_{epw}(st_6, c) + \mathbb{T}_{epw}(st_7, c) + \mathbb{T}_{epw}(st_8, c)$$
$$= \mathbb{T}_{pgc}(st_1, c) + \mathbb{T}_{pgc}(st_2) \times \mathcal{P}(st_2, c)$$
$$+ \mathbb{T}_{pgc}(st_3) \times \mathcal{P}(st_3, c) + \mathbb{T}_{pgc}(st_4) \times \mathcal{P}(st_4, c)$$
$$+ \mathbb{T}_{pgc}(st_5) \times \mathcal{P}(st_5, c) + \mathbb{T}_{pgc}(st_6) \times \mathcal{P}(st_6, c)$$
$$+ \mathbb{T}_{pgc}(st_7) \times \mathcal{P}(st_7, c) + \mathbb{T}_{pgc}(st_8) \times \mathcal{P}(st_8, c)$$

The estimated execution time and estimated power-gating time for region M

FIG. 5E

PROBABILISTIC FRAMEWORK FOR COMPILER OPTIMIZATION WITH MULTITHREAD POWER-GATING CONTROLS

CROSS REFERENCE TO RELATED APPLICATIONS

This application claims the benefit of priority of U.S. Provisional Application No. 62/183,757, filed Jun. 24, 2015, and included herein by reference in its entirety.

BACKGROUND OF THE INVENTION

1. Field of the Invention

This application relates to compiler optimization and more specifically to a compiler which inserts predicated power-gating instructions at locations corresponding to selected power-gateable windows into multithread power-gateable computer code.

2. Description of the Prior Art

Power optimization has been the focus point for embedded systems, as many systems are mobile devices with limited battery resources. Approaches for minimizing the power dissipation are now needed in all levels including the algorithmic, compiler, architectural, logic, and circuit levels. As a compiler is in the layer to interact with architecture design, the compiler efforts for low-power in addition to compiler for performance optimization are now considered important.

Works in compilers for power optimization include utilizing the value locality of registers, scheduling VLIW (very long instruction word) instructions to reduce the power consumption on the instruction bus, compiler for low-power with design patterns, and gating the clock to reduce workloads.

Work in compilers for reducing leakage power can employ power-gating. Various studies have attempted to reduce the leakage power using integrated architectures and compiler-based power-gating mechanisms. These approaches involve compilers inserting instructions into programs to shut down and wake up components as appropriate based on a data-flow analysis.

Compiler research for power recently started to address two key issues. One is on the power reduction on stateful components with voltage drop and sleep mode mechanism, as stateful components occupy a large percentage of system. The other issue is on the power gating issue with multi-threading environments. Conventional power-gating control frameworks are only applicable to single-thread programs, and care is needed in multithread programs since some of the threads might share the same hardware resources. Turning resources on and off requires careful consideration of cases where multiple threads are present.

A multithread power-gating framework was proposed to deal with the case of multithread systems in a bulk-synchronous parallel (BSP) model. The BSP model, proposed by Valiant, is designed to bridge between theory and practice of parallel computations. The BSP model structures multiple processors with local memory and a global barrier synchronous mechanism. In addition, the work also supports the more flexible H-BSP model that splits processors into groups and dynamically runs BSP programs within each group in a bulk-synchronous fashion, while the multicore BSP provides a hierarchical multi-core environment with independent communication costs.

One of the shortcomings in the hierarchical BSP model is that it is very conservative in power optimization in that it only applies power gating to shut down unused components in the head and tail of a two concurrent thread region. This significantly limits the potential of power optimization to the whole concurrent region.

SUMMARY OF THE INVENTION

A probabilistic framework for compiler optimization with multithread power-gating controls comprises scheduling all thread fragments of a multithread computer code with the estimated execution time, logging all time stamps of events including the start of each thread fragment and the end of each thread fragment, and sorting and unifying the logged time stamps. Time slices are constructed by adjacent time stamps. A power-gating time having the probability of the component being turned off for each time slice is determined. Power-gateable windows that reduce energy consumption of each time slice according to the power-gating time are selected. The complier inserts predicated power-gating instructions at locations corresponding to the selected power-gateable windows into the power-gateable computer code.

Also disclosed is method of power-gating a device having a component comprising scheduling all thread fragments of a multithread computer code with the estimated execution time, logging all time stamps of events including the start of each thread fragment and the end of each thread fragment, and sorting and unifying the logged time stamps. Adjacent time stamps are used to construct a plurality of time slices. All thread fragments estimated to be executing during a time slice of the plurality of time slices are included. At least one power-gating time having the component turned off for the time slice is determined. At least one power-gateable window that reduces energy consumption within the time slice according to the at least one power-gating time is selected. The complier inserts predicated power-gating instructions at locations corresponding to the selected power-gateable window into the multithread computer code to generate power-gateable computer code. The power-gateable computer code is executed with the device.

A method of generating power-gating computer code is also disclosed. A time slice for thread fragments of a multithread program is constructed, the time slice beginning in a time stamp and ending in another adjacent time stamp, the time slice including all thread fragments estimated to be executing between two time stamps. A power-gating time having a probability that a component is turned off for the time slice is determined. Power-gateable windows that reduce energy consumption during the power-gating time are selected. The complier inserts predicated power-gating instructions at locations corresponding to the selected power-gateable windows into the power-gateable computer code.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 5A-5E show example time slices having nine thread fragments and a component, the scheduling result, the probability the component c being turned off for each time slice, execution time for each time slice, and the estimated power-grating time for the MHP region M, respectively.

DETAILED DESCRIPTION

A multithread power-gating estimation method is disclosed that comprises a power model for multithread power-gating and a probabilistic model with a multithread power-gating algorithm for reducing leakage power when executing multithread programs on simultaneous multi-threading (SMT) machines. The method analyzes multi-thread programs in hierarchical BSP models and estimates the efficiency of applying power-gating on threads. The thread fragment graph in BSP models with first-come-first-serve (FCFS) policy is scheduled according to the estimated execution time from sequential analysis phase. The scheduling result is then used to construct time slices of a May-happen-in-parallel (MHP) region, which are the basic units of the analysis. Note that May-happen-in-parallel (MHP) analysis computes which statements may be executed concurrently in a multithread program.

By progressively selecting power-gateable windows in different time slices, the analysis method finds the minimal energy consumption with the proposed power model for multithread power-gating. The energy consumption of a time slice is estimated by the estimated execution time of the slices, the number of inserted predicated-power-gating instructions, the estimated power-gating time, and the estimated power-gating overhead energy. Compared to previous work, the method applies power control in multithread programs to the whole program of a concurrent thread region while the previous work only considers to the head and tail of a concurrent region.

The disclosed probabilistic model enables power optimization whenever the probability is profitable.

The objective of this work is to build up a probabilistic framework for compiler optimization with multithread power-gating controls. The target architecture is a simultaneous multithreading (SMT) machine equipped with predicated power-gating instructions such as is shown in FIG. 1.

In general, a predicated execution refers to the conditional execution of an instruction based on a Boolean source value; such an instruction is executed while the predicate is true otherwise it is ignored. With the similar concept, the predicated power-gating instructions are devised for controlling the power-gating of a set of concurrent threads in the previous work.

Predicated-power-off and predicated-power-on for a specific component consist of steps of, (1) keeping track of the number of threads that are using the component, (2) tuning off the component when it is the last exit of all threads using this component, (3) turning on the component only when it is actually in the off state.

Figure 1:
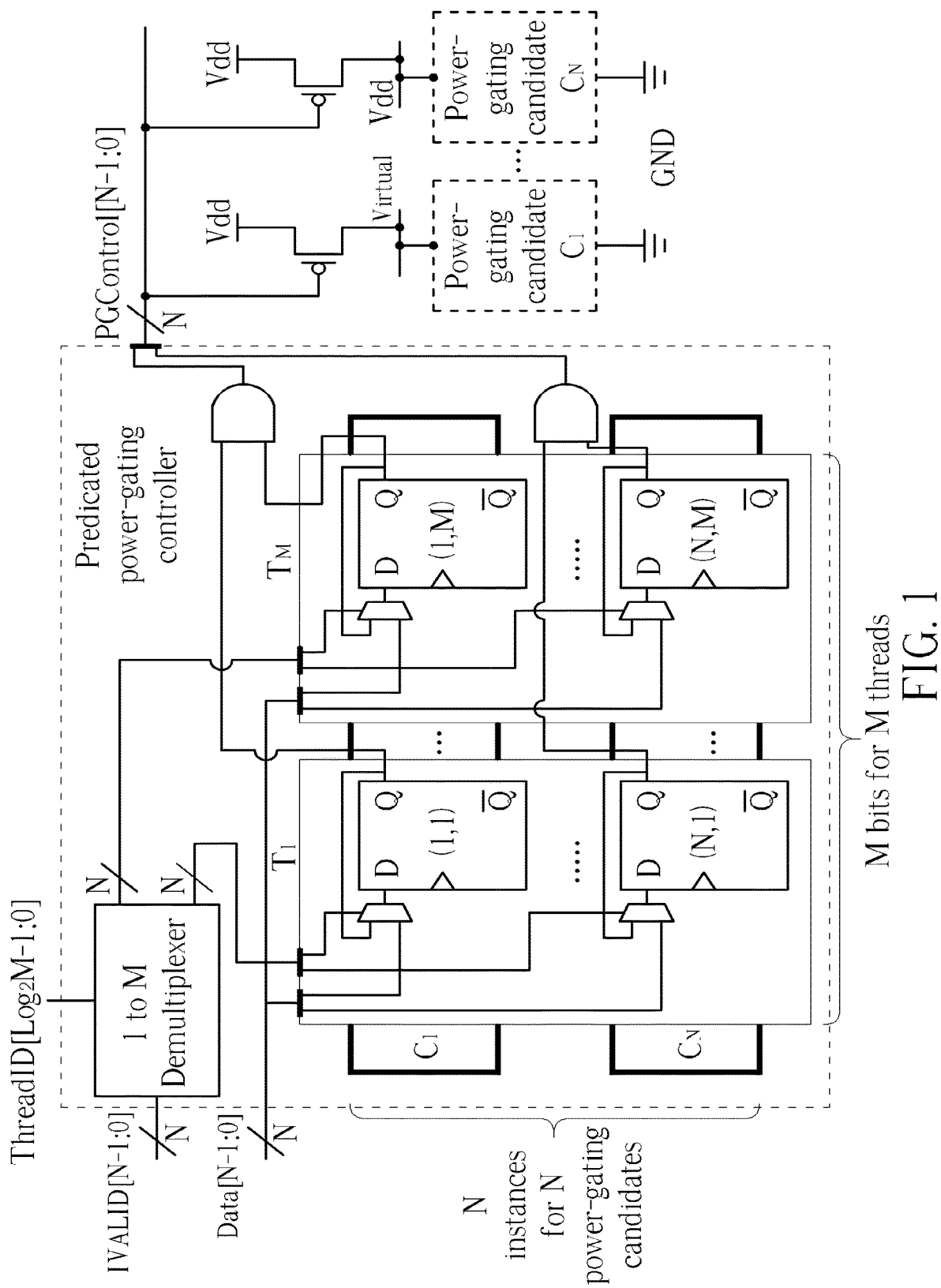
FIG. 1 is a block diagram for a predicated power-gating synthesis.

FIG. 1 illustrates a predicated power-gating controller that is based on a bit array design for performing predicated power-gating operations. As shown in FIG. 1, a predicated power-gating controller (PPGC) for M threads and N power-gating candidates comprises an M×N-bit D flip-flop array, a 1-to-M demultiplexer, and several AND logic gates. The inputs of the circuit include a ThreadID signal, a Data signal, and an IVALID signal. The DATA signal carries directives of component activities (false for active and true for inactive) with a relevant validation signal IVALID. The PPGC stores the content of Data signal with considering IVALID signal into the array indexed by ThreadID. The M×N-bit D flip-flop thus stores the component activities for each thread. The output of the circuit is a PGControl signal, which is raised to turn off a component while all component activities of the component are set to be inactive. The power consumption of such a design is negligible compared to functional units.

Algorithm 1 summarizes the compilation flow for generating the power-control instructions based the probabilistic analysis for multithread programs. Within a BSP model, threads processed by processors are separated by synchronous points, called supersteps that comprise of a pair of computation and communication phases, allowing processors to compute data into local memory until encountering a global synchronous point to synchronize local data with each other. Accordingly, step 1 of the algorithm applies thread fragment concurrency analysis (TFCA) to component usages shared by multiple threads. This step constructs the thread fragment graph in order to compute the lineal thread fragments and MHP regions for concurrency analysis of BSP programs. Next, step 2 figures out the detailed component usages via data-flow equations by referencing component-activity data-flow analysis (CADFA). Step 3 analyzes the locations for predicated power-gating instruction insertion according to the information gathered in the previous steps while considering the cost model (PMPGA compiler framework for power optimization will be discussed later). Finally, Step 4 produces the power-control assembly codes.

---

ALGORITHM 1
Probabilistic Multithread Power-Gating Framework

---

Input: A source program
Output: A program with power-gating control
begin
   1. Perform thread fragment concurrency analysis for BSP programs
   2. Perform component-activity data-flow analysis
   3. Perform probabilistic multithread power-gating analysis
   4. Produce predicated-power-gating instructions and power-gating
      instruction

---

Figure 2:
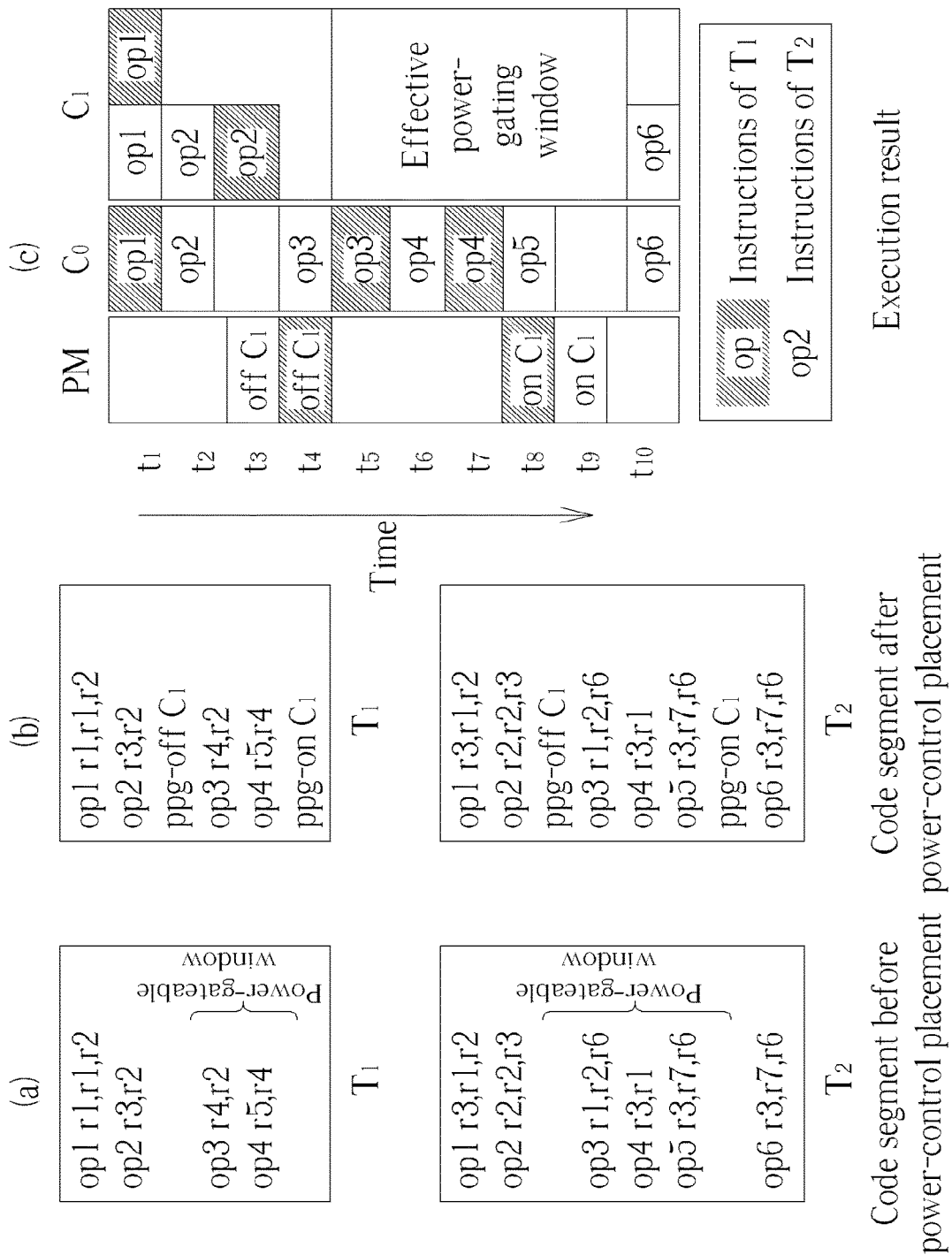
FIG. 2 illustrates a power-gateable window and an effective power-gating window.

Here the concept of a power-gateable window and effective power-gating window is introduced. In compile time, a period of time of a thread fragment where the specific functional unit is not used is a power-gateable window. At runtime, a period of time of an MHP region is an effective power-gating window when predicated power-gating instructions suggest hardware to power-off the specific functional unit. The example shown in FIG. 2 is used to explain these two terms.

FIG. 2A lists two code segments $T_1$, $T_2$ that are under CADFA analysis. CADFA reports possible power-gating code segments, which are denoted by power-gateable windows herein. The method evaluates the power saving and decides to insert predicated power-gating instructions into the code segments as shown in FIG. 2B. The execution results for the code segment in an SMT environment is shown in FIG. 2C.

The SMT environment comprises a power manager PM and two power-gateable components $C_0$ and $C_1$. The latency of powering on of a functional unit is assumed to be one cycle; the dependency between an instruction and its relative functional unit is maintained by the power manager, i.e., instructions will be blocked until the relative functional units are all available.

At runtime, two predicated power-gating-off instructions at $t_3$ and $t_4$ (from threads $T_2$ and $T_1$, respectively) turn off component $C_1$ at $t_5$ because all threads are willing to turn off the component; the predicated power-gating-on instructions at $t_8$ (from thread $T_1$) turns on the component at $t_9$ because the powering-on operation takes one cycle latency. The turned-off time, from $t_5$ to $t_9$ in the illustration, is thus named an effective power-gating window herein.

Ideally, if the compiler analysis knows the precise size of effective power-gating window (that is, the duration of power-gating time), the power-gating instruction insertion could be made accurately. However, at compilation time it is hard to know how instructions would be scheduled in hardware at runtime. Lots of factors could affect the execution result including (but not limited to) replacement polices of instruction/data cache, size of instruction queue, size of reservation station, and number of execution units.

Figures 3A, 3B:
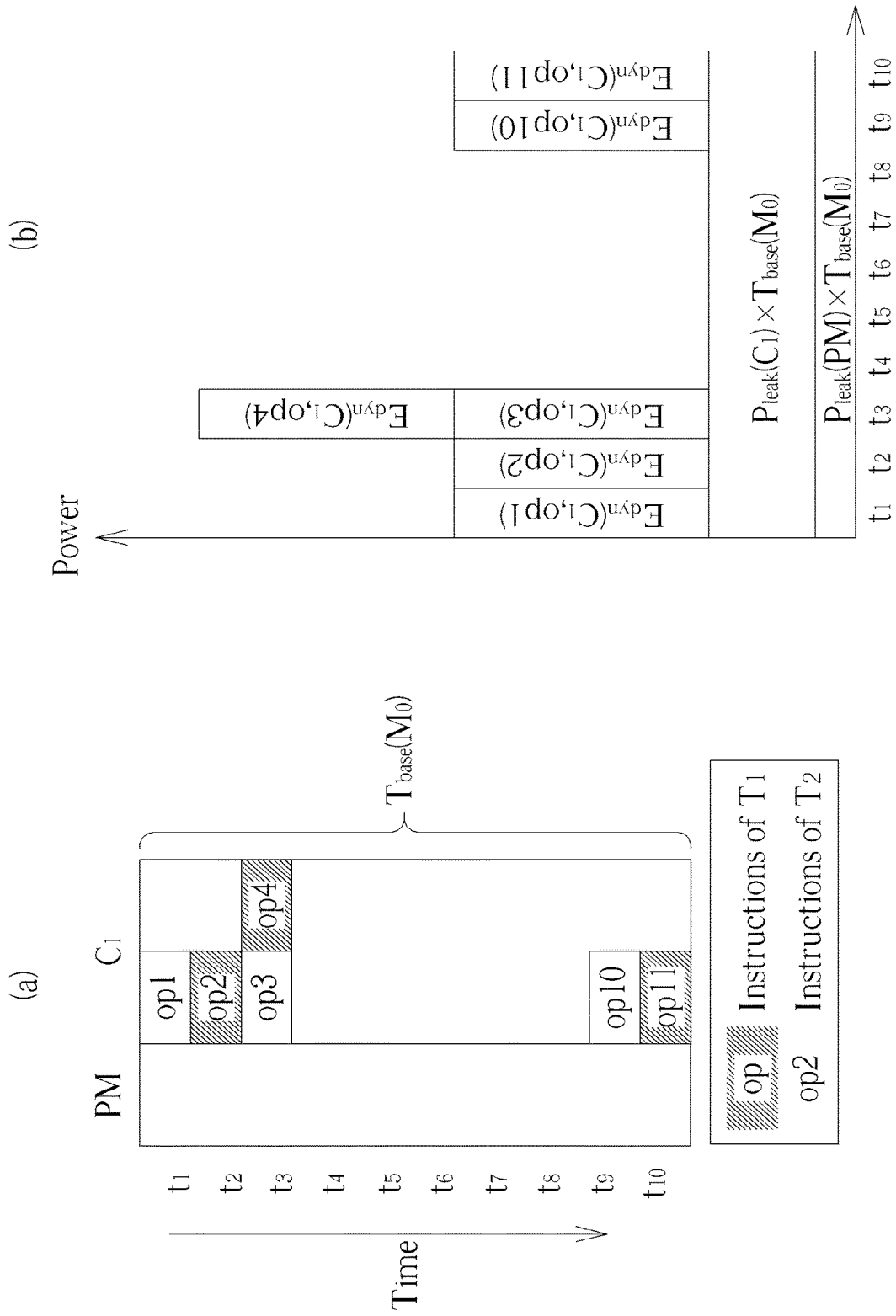
FIGS. 3A-3B illustrate execution result and power consumption for an example code segment without power-gating control.
Figures 3C, 3D:
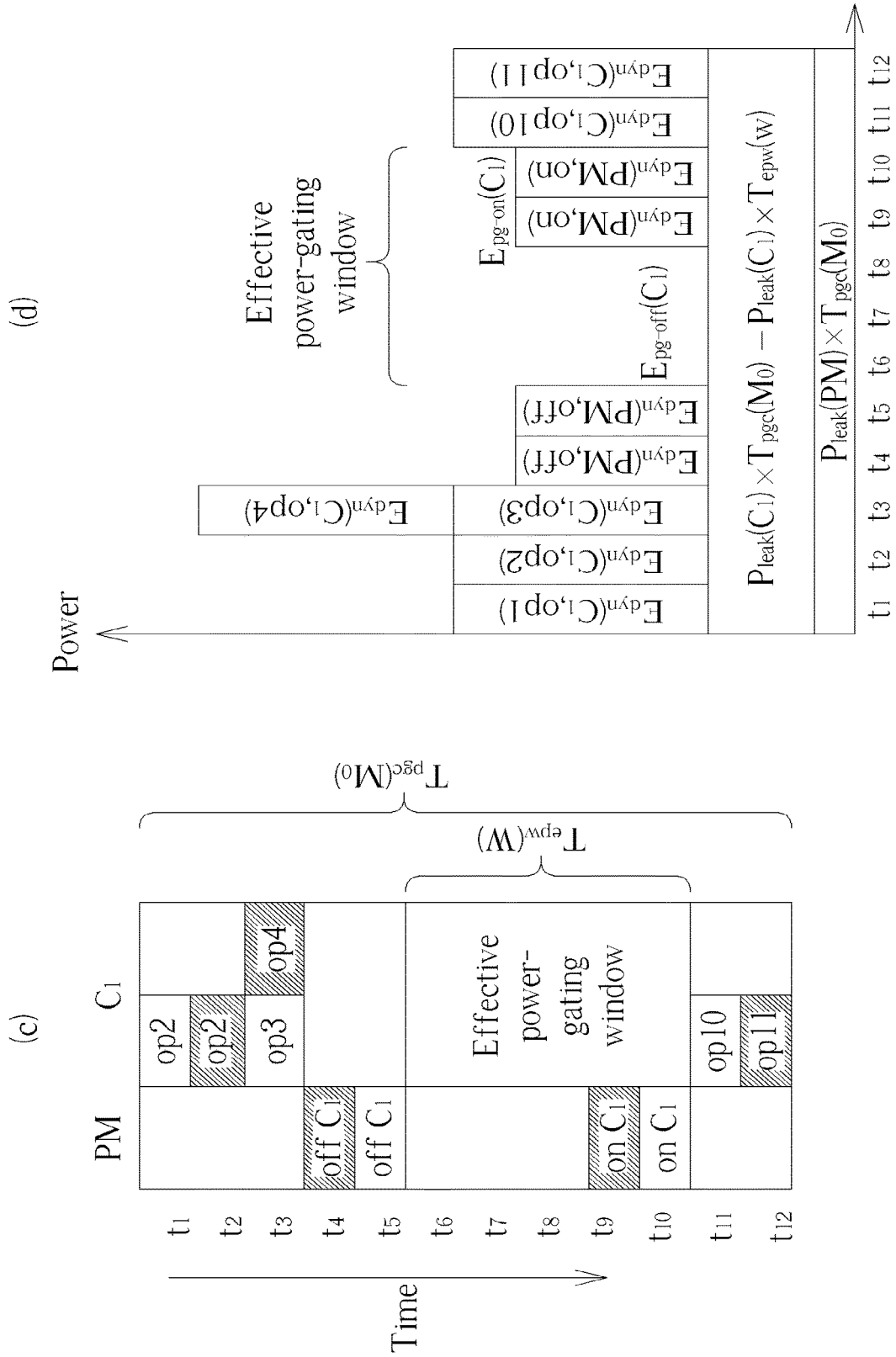
FIGS. 3C-3D illustrate execution result and power consumption for the example code segment of FIGS. 3A-3B with power-gating control.

FIG. 3 shows two scenarios for an MHP region $M_0$, where power-gating controls are adopted or withdrawn. In region $M_0$, two threads $T_1$ and $T_2$ are executed concurrently on a processor equipped with a power manager PM and two components $C_0$ and $C_1$. For simplification, only the energy consumption of power manager PM and power-gating candidate $C_1$ is illustrated. FIG. 3A shows the execution result for a code segment without power-gating control, which is the base case for power model construction. FIG. 3B shows the energy consumption of execution result of FIG. 3A. FIG. 3C illustrates the execution result for the same code segment with power-gating control, where two predicated power-gating instructions turn off C1 and forms an effective power-gating window. FIG. 3D illustrates the energy consumption of execution result of FIG. 3C.

A power consumption model for effective power-gating windows is constructed as follows. A simple version of a power model for an effective power-gating window for a power-gating candidate is first built. Then the simple power model is extended to multiple effective power-gating windows for multiple power-gating candidates. FIG. 3 illustrates an effective power-gating window and its energy consumption for a power model construction, where two threads $T_1$ and $T_2$ are executed concurrently on a processor equipped with a power manager PM and two components $C_0$ and $C_1$ with/without power-gating controls. For simplification, only the energy consumption of power manager PM and power-gating candidate $C_1$ is illustrated. The execution results for code segments without/with power-gating control are illustrated in FIG. 3A and FIG. 3C, respectively. The energy consumption for code segments without/with power-gating control are illustrated in FIG. 3B and FIG. 3D, respectively. The x-axis of FIG. 3B and FIG. 3D represents a timeline and y-axis represents leakage energy consumption of the power-gateable functional unit.

For a single effective power-gating window shown in FIG. 3, it is sufficient to insert power-gating instructions to the relevant power-gateable windows when the energy consumption is benefited from power-gating controls. Let $E_{base}(M_0)$ be the energy consumption of the MHP region $M_0$ in FIG. 3A, where no power-gating control is adopted; and $E_{pgc}(M_0)$ be the energy consumption of $M_0$ in FIG. 3C, where power-gating control is adopted. The sources of power consumption include dynamic power and leakage power. With clock-gating techniques, the dynamic power of an execution unit is reduced when no instruction is executed on the unit. The dynamic energy consumption of an operation is denoted as $E_{dyn}(c, op)$, where c is an execution unit and op is an operation to be executed. Here, it is assumed that the dynamic power is controlled perfectly with clock-gating techniques, which means that execution consumes dynamic power when there is instruction executed on the execution unit. As a result, the dynamic energy consumption of power-gating candidate $C_1$ in MHP region $M_0$ is the total dynamic energy consumed by all operations. The leakage energy consumption is obtained by leakage power times active time of the power-gating candidate. Let $P_{leak}$ be the leakage power consumed by an execution unit; $T_{base}$ and $T_{pgc}$ be the execution time of the MHP region without or with power-gating control, respectively. Compared to FIG. 3A, the execution time of FIG. 3C varies due to additional power-gating instructions (the off $C_1$ instruction at $t_4$) and the powering-on delay (the delay cycle at $t_{10}$). Switching component state takes extra energy as illustrated in FIG. 3D. The overhead energy from switching component C is denoted as $E_{pgo}(c)$, which includes $E_{pg-off}$ and $E_{pg-on}$ in FIG. 3D.

We have $E_{base}$ and $E_{epw}$ as follows:

$$E_{base}(M_0) = [P_{leak}(PM) + P_{leak}(C_1)] \times T_{base}(M_0) + \sum_{op \in OP(M_0)} E_{dyn}(C_1, op) \quad \text{EQUATION 1}$$

$$E_{pgc}(M_0) = [P_{leak}(PM) + P_{leak}(C_1)] \times T_{pgc}(M_0) - P_{leak}(C_1) \times T_{epw}(w) + E_{pgo}(C_1) + \sum_{op \in OP(M_0)} E_{dyn}(C_1, op) + \sum_{op \in PG(M_0)} E_{dyn}(PM, pg) \quad \text{EQUATION 2}$$

For determining whether to apply power-gating controls to the MHP region, the saved energy $E_{saving}$ can be estimated by subtracting $E_{base}$ to $E_{pgc}$ as follows:

$$E_{saving}(M_0) = E_{base}(M_0) - E_{pgc}(M_0) \quad \text{EQUATION 3}$$
$$= [P_{leak}(PM) + P_{leak}(C_1)] \times$$
$$[T_{base}(M_0) - T_{pgc}(M_0)] + P_{leak}(C_1) \times$$
$$T_{pgc}(w) - E_{pgo}(C_1) -$$
$$\sum_{op \in PG(M_0)} E_{dyn}(PM, pg)$$

When the estimated $E_{saving}(M_0)$ is positive, it is sufficient to insert power-gating instructions into the code segment because adopting power-gating control on the MHP region gains profit on energy.

For multiple effective power-gating windows and multiple power-gating candidates in an MHP region, equations (1), (2), and (3) need certain extension to deal with multiple execution units and multiple effective power-gating windows. The set of all execution units is denoted as $C = \{C_1, C_2, \ldots, C_i\}$. The execution units used in a operation op is denoted as $C(op)$, which is a subset of all execution units C. A power-gating candidate related to an effective power-gating window w is denoted as U(w). Let $W(M_0)=\{w1, w2, \ldots, wn\}$ be a set of effective power-gating windows of the MHP region.

$$E_{base}(M_0) = \left[P_{leak}(PM) + \sum_{c \in C} P_{leak}(c)\right] \times T_{base}(M_0) + \sum_{op \in OP(M_0), c \in C(op)} E_{dyn}(c, op) \quad \text{EQUATION 4}$$

$$E_{pgc}(M_0) = \left[P_{leak}(PM) + \sum_{c \in C} P_{leak}(c)\right] \times T_{pgc}(M_0) - \sum_{w \in W(M_0)} T_{epw}(w) \times P_{leak}(U(w)) + \sum_{w \in W(M_0)} E_{pgo}(U(w)) + \sum_{op \in PG(M_0)} E_{dyn}(Pm, pg) + \sum_{op \in OP(M_0), c \in C(op)} E_{dyn}(c, op) \quad \text{EQUATION 5}$$

The energy saving $E_{saving}$ for the MHP region at runtime is listed as follows:

$$E_{saving}(M_0) = E_{base}(M_0) - E_{pgc}(M_0) \quad \text{EQUATION 6}$$

$$= \left[P_{leak}(PM) + \sum_{c \in C} P_{leak}(c)\right] \times [T_{base}(M_0) - T_{pgc}(M_0)] + \sum_{w \in W(M_0)} [T_{epw}(w) \times P_{leak}(U(w)) - E_{pgo}(U(w))] - \sum_{op \in PG(M_0)} E_{dyn}(PM, pg)$$

In equation 6, the total saved energy could be categorized into four parts, including the varying energy consumption from varying performance, saved leakage energy, extra energy consumed by power-gating instruction execution, and power-gating overhead energy. The energy saving in equation 6 is constructed from effective power-gating window. However, since it is impossible to know how each effective power-gating window would be like at static analysis, the equation needs certain transformation. Thus equation 6 is further transformed and reduced as follows.

We denote total leakage power consumption of the system and the variation execution time as $P_{leak}^{sys}$ and $T_{pgc}^{\Delta}$, respectively.

$$P_{leak}^{sys} = P_{leak}(PM) + \sum_{c \in C} P_{leak}(c),$$

$$T_{pgc}^{\Delta} = T_{base}(M_0) - T_{pgc}(M_0) \quad \text{EQUATION 7}$$

The total execution time and power-gating overhead energy of an effective power-gating windows W on designated component c are denoted as $T_{epw}(M, c)$ and $E_{pgo}(M, c)$, respectively.

$$T_{epw}^{ttl}(M, c) = \sum_{w \in W(M) \wedge U(w)=c} T_{epw}(w), \quad \text{EQUATION 8}$$

$$E_{pgo}^{ttl}(M, c) = \sum_{w \in W(M) \wedge U(w)=c} E_{pgo}(c)$$

For all effective power-gating windows $W(M_0)$, the execution time and the power-gating overhead energy can be re-written with equation 8 as follows.

$$\sum_{w \in W(M_0)} T_{epw}(w) = \sum_{c \in C} \sum_{w \in W(M) \wedge U(w)=c} T_{epw}(w) \quad \text{EQUATION 9}$$

$$= \sum_{c \in C} T_{epw}^{ttl}(M_0, c)$$

$$\sum_{w \in W(M_0)} E_{pgo}(U(w)) = \sum_{c \in C} \sum_{w \in W(M) \wedge U(w)=c} E_{pgo}(c) \quad \text{EQUATION 10}$$

$$= \sum_{c \in C} E_{pgo}^{ttl}(M_0, c)$$

By equations 7, 9, and 10, equation 6 can be further re-written as component driven equation, which is useful for the execution time estimation.

$$E_{saving}(M_0) = P_{leak}^{sys} \times T_{pgc}^{\Delta}(M_0) + \quad \text{EQUATION 11}$$

$$\sum_{c \in C} [T_{epw}^{ttl}(M_0, c) \times P_{leak}(c) - E_{pgo}^{ttl}(M_0, c)] - \sum_{pg \in PG(M_0)} E_{dyn}(PM, pg)$$

By equation 11, the total energy saving for MHP region $M_0$ can be broken down into four parts, including variation energy from variation performance, total saved leakage energy of all components, total power-gating overhead of all components, and total dynamic energy consumed by predicated power-gating instructions. In the following section, some methods to estimate those variable parameters are purposed.

In this section, methods are proposed to estimate parameters of power model described above based on probabilistic analysis. The energy consumption of power-gating instructions is assumed to be a fixed number, which means that the energy consumed by power-gating instructions is to be estimated by average power-gating instruction consumption times the number of power-gating instructions as listed in Equation 12.

$$\sum_{pg \in PG(M_0)} E_{dyn}(PM, pg) = N_{ppg}(M_0) \times E_{dyn}^{ppg} \quad \text{EQUATION 12}$$

In equation 12, $N_{ppg}(M_0)$ denotes the number of predicated power-gating instructions and $E_{dyn}^{ppg}$ denotes the average dynamic energy consumed by power-gating instructions. The total overhead energy of power-gating a component c is estimated by the number of the effective power-gating windows times the overhead energy consumption consumed by a power-gating operation.

$$E_{pgo}^{ttl}(M_0, c) = N_{epw}(M_0, c) \times E_{pgo}(c) \quad \text{EQUATION 13}$$

In equation 13, $N_{epw}(W(M_0))$ denotes the number of effective power-gating windows and $E_{pgo}(c)$ denotes the overhead energy consumed by single power-gating operation. By equations 12 and 13, equation 11 is thus rewritten as follows:

$$E_{saving}(M_0) = P_{leak}^{sys} \times T_{pgc}^{\Delta}(M_0) +$$
$$\sum_{c \in C} [T_{epw}^{ttl}(M_0, c) \times P_{leak}(c) - N_{epw}(M_0, c) \times E_{pgo}(c)] -$$
$$N_{ppg}(M_0) \times E_{dyn}^{ppg}$$

EQUATION 14

Herein, leakage power of total system $P_{leak}^{sys}$, leakage power of a component $P_{leak}(c)$, the overhead energy of single power-gating operation $E_{pgo}(c)$, and the dynamic energy consumption of a predicated power-gating instruction $E_{dyn}^{ppg}$ are estimated as fixed number. The other parameters, including the variation of execution time $T_{pgc}^{\Delta}(M_0)$, the total execution time of effective power-gating windows for a component $T_{epw}^{ttl}(M_0, c)$, the number of effective power-gating windows $N_{epw}(M_0, c)$, and the number of power controlling instructions $N_{ppg} M_0)$, are estimated as described in this section. Since all these parameters are decided at runtime, it is reasonable to estimate them based on probability in compilation time.

Figure 4B:
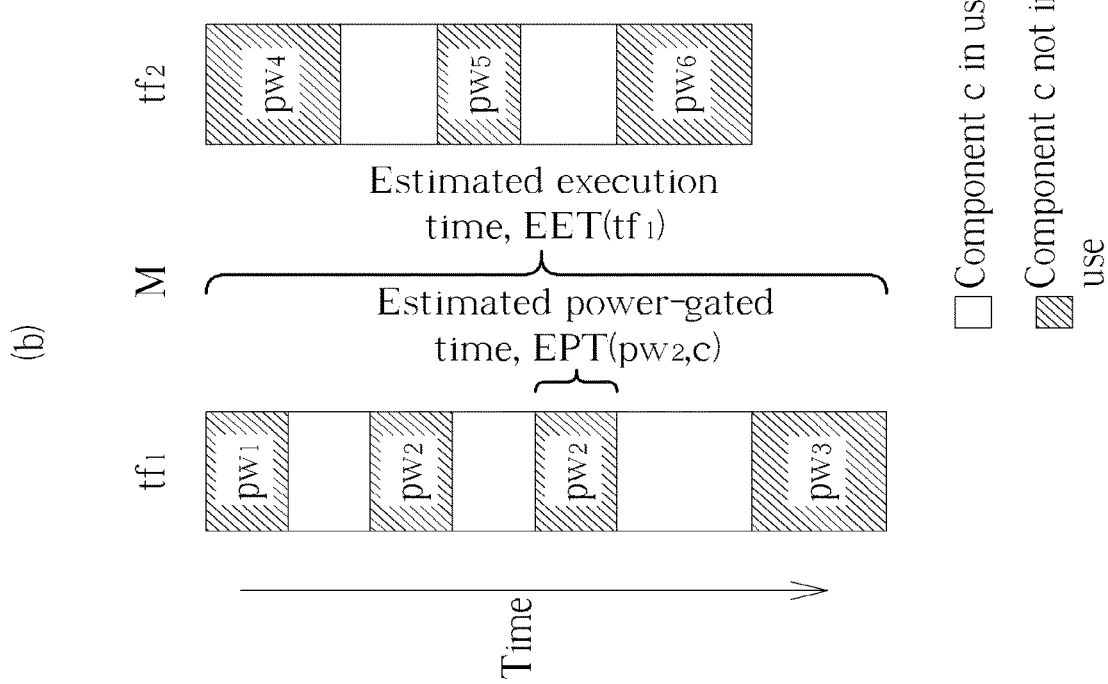
FIGS. 4A-4B illustrate an example code segment and execution result of a region consisting of two threads and six power-gateable windows.
Figure 4A:
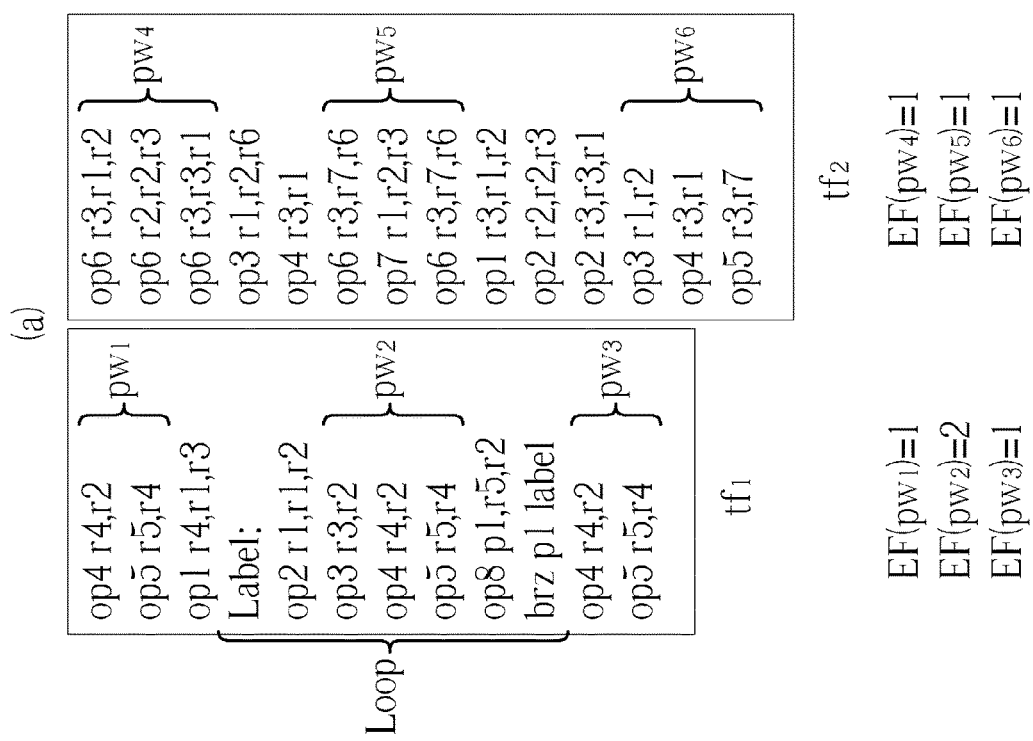

FIG. 4 illustrates code segments and execution result of an MHP region M, which comprises two thread fragments $tf_1$ and $tf_2$ and six power-gateable windows $pw_1$ to $pw_6$. In FIG. 4A, code segments of the two thread fragments $tf_1$ and $tf_2$ and the estimated execution frequency EF( ) are listed. There is a loop in $tf_1$; thus the execution frequency of power-gateable window $pw_2$, denoted as $EF(pw_2)$, is estimated to be two, which means that $pw_2$ is estimated to be executed twice. In FIG. 4B, the execution of MHP region M is illustrated. Among power-gateable windows, $pw_2$ is executed twice as expected. Power-gateable windows are specific code segments detected in a program where a specific component is not used as previously mentioned. All power-gateable windows of thread fragment tf for power-gateable component c is denoted as PW(tf, c). An MHP region M comprises a set of thread fragments $\{tf_1, tf_2, \ldots, tf_n\}$. The set of power-gateable windows for an MHP region M and a power-gateable component c is denoted as PW(M, c). Note that not all power-gateable windows could gain benefit on energy. The disclosed methods could provide a hint to guide a compiler selecting a subset of power-gateable windows that are efficient in reducing total energy, named selected power-gateable windows. The set of selected power-gateable windows for a MHP region M and a power-gateable component c is denoted by SPW(M, c), where SPW(M, c)⊆PW(M, c). The component usage statistics of a power-gateable window pw of a single thread fragment tf are reported by CADFA, including the power-gateable time, the total execution time, and the execution frequencies, denoted by EPT(pw), EET(tf), and EF(pw), respectively. The execution frequency is the number of execution of a specific node in a control-flow graph, which can be achieved from profitability computation or profiling. The total execution time is the estimated time duration of executing the whole program, while the power-gateable time is the estimated time duration of executing a power-gateable window. As shown in FIG. 4, an MHP region M comprises the two thread fragments ($tf_1$ and $tf_2$) and six power-gateable windows ($pw_1$ to $pw_6$).

The estimation of effective power-gating windows for an MHP region M and a power-gating candidate c∈C includes the number of predicated power-gating instructions, the number of effective power-gating windows, and the total power-gated time, denoted as $N_{ppg}(M)$, $N_{epw}(M, c)$ and $T_{epw}(M, c)$.

The number of predicated power-gating instructions $N_{ppg}^{est}$ is computed as two times the sum of execution frequency of selected power-gateable windows, because each selected power-gateable windows would be expanded in code generation to insert two predicated power-gating instructions: one for powering-off and the other for powering-on; thus the number of predicated power-gating instructions for a selected power-gateable window would be two times the execution frequency, and the total number of predicated power-gating instructions for a component c in an MHP region would be two times the sum of execution frequency of all selected power-gateable windows.

$$N_{ppg}^{est}(M) = 2 \times \sum_{tf \in M, c \in C, spw \in SPW(tf, c)} EF(spw)$$

EQUATION 15

The number of effective power-gating window can be estimated by the average number of selected power-gateable window of MHP threads.

$$N_{epw}(M, c) = \underset{tf \in M, spw \in SPW(tf, c)}{avg} EF(spw)$$

EQUATION 16

The estimation of total execution time of an MEW region is affected by several factors, including processor latencies and memory access latency. The memory accessing time is estimated via cache hit rate and cache-miss penalty.

The execution time can be estimated via IPC based factors and memory access latency. To estimate the latency caused by structure hazard, the execution time via the summation and IPC is estimated. IPC reflects the execution capacity of a system, and the summation of component usage ratio of all threads represents the execution capacity needed by the program. The estimated execution time of component utilization, denoted as $T_{pgc}^{utl}$, is listed as follows.

$$T_{pgc}^{utl}(M) = \max_{c \in C} \frac{\sum_{tf \in M} utl(tf, c)}{f_{IPC}(N_M)}$$

EQUATION 17

In equation 17, utl(tf, c) denotes the component utilization of component c with thread fragment tf and $f_{IPC}(NM)$ denotes a IPC factor that is relative to number of concurrent threads NM.

The estimation of total power-gated time is computed as expected value of probability to turn off a component. The estimated total power-gated time can be computed by probability and total execution time. The probability to turn off a component in single thread is constructed first. Let $T_{pgc}(M)$ be the estimated total execution time of an MHP region M as mentioned above. The probability of a thread fragment tf executed without a power-gateable component c is denoted as P(tf, c).

$$\mathcal{P}(tf, c) = \frac{\sum_{spw \in SPW(tf, c)} EPT(spw, c)}{EET(tf)}$$

EQUATION 18

In equation 18, EET(tf) is the estimated execution time of the thread fragment and EPT(tf, c) is the power-gateable time of a power-gateable window spw. The probability of an MHP region M to use a power-gateable component c is denoted as P(M, c). As previously mentioned, to turn off a component means that all concurrent thread fragments are executed without needing the component. Thus the probability of a component to be turned-off is computed as a series production of all the probability to turn-off a component of single thread.

$$\mathcal{P}(M, c) = \prod_{tf \in M} \mathcal{P}(tf, c) \quad \text{EQUATION 19}$$

$$= \prod_{tf \in M} \frac{\sum_{spw \in SPW(tf,c)} EPT(spw, c)}{EET(tf)}$$

$T_{epw}$ is then as follows:

$$\mathbb{T}_{epw}(M,c) = \mathbb{T}_{pgc}(M) \times \mathcal{P}(M,c) \quad \text{EQUATION 20}$$

Figure 5A:
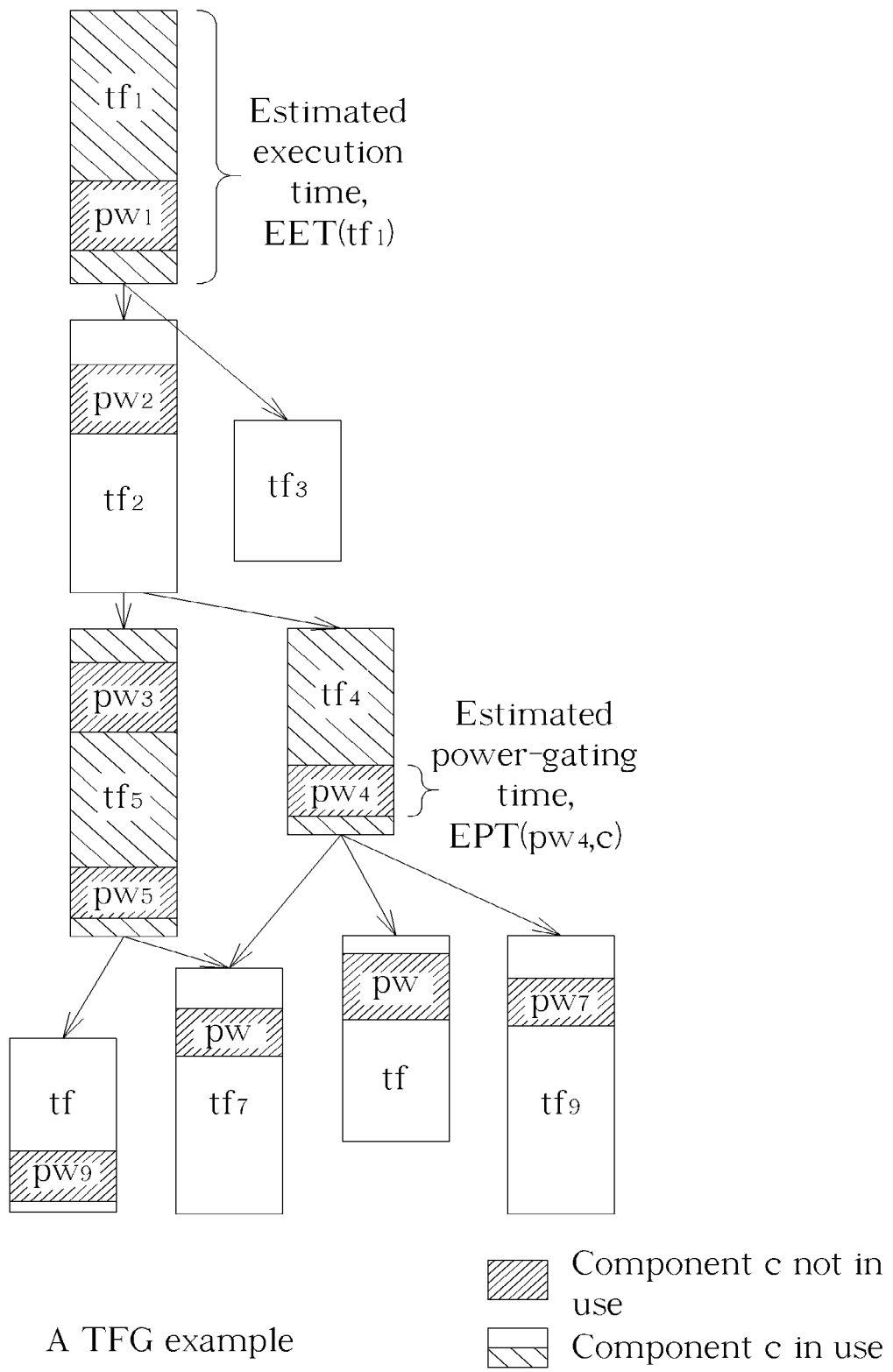

A multithread program might not have a fixed number of threads all the execution time. To estimate the number of thread fragments, we slice the execution of an MHP region into pieces to deal with execution time estimation. A piece, named sliced time, is a set of concurrent thread fragments in a specific period of the execution time. FIG. 5 shows an example multithread program with nine thread fragments. In FIG. 5A, nodes denote a thread fragment and edges denote the dependency between thread fragments. The number of concurrent thread fragments in FIG. 5A varies in the region.

Algorithm 2 lists a method to evaluate power-gateable windows.

of a thread fragment. After sorting and unifying time stamps, sliced time is constructed by adjacent time stamps of each thread fragment. Thread fragments in the specific range of time are added into the specific sliced time, denoted by st. The execution time of a sliced time st is denoted by $T_{pgc}(st)$, which is calculated by equations mentioned below. The power-gating time and the probability of a sliced time period is estimated also as mentioned below.

The probability to turn off a component of a sliced time st is computed as the product of a series of probability.

$$\mathcal{P}(st, c) = \prod_{tf \in st} \mathcal{P}(tf, c) \quad \text{EQUATION 21}$$

$$= \prod_{tf \in st} \frac{\sum_{spw \in SPW(tf,c)} EPT(spw, c)}{EET(tf)}$$

The power-gating time is computed by the product of probability and execution time.

$$\mathbb{T}_{epw}(st,c) = \mathcal{P}(st,c) \times \mathbb{T}_{pgc}(st) \quad \text{EQUATION 22}$$

The estimated power-gating time of a MHP region M is thus computed as the sum of all EPT of sliced time in the region.

$$\mathbb{T}_{epw}(st, c) = \sum_{st \in M} \mathbb{T}_{pgc}(st, c) \quad \text{EQUATION 23}$$

---

ALGORITHM 2
Probability based time sliced power directives placement algorithm

---

Input: A multithread program and its MHP information, the selected
  power-gateable window SPW( ) information from MTPGA, and its EET( ) and
  EPT( ) information from CADFA
Output: A program with predicated power-gating control
foreach MHP region M do
  Schedule thread fragments with FCFS policy and log all time stamps of
  events
  Unify and sort all time stamps; let the sorted time stamps be TS = (ts0,
  ts1, ..., tsk), where ts denotes a time stamp and TS denotes the list of time
  stamps with k elements
  for i ∈ {1, ..., k} do
    Construct a sliced time for each time period $ts_{i-1}$ to $ts_i$
  foreach power-gating candidate c ∈ C do
    Initialize $E'_{saving}$ and $E_{saving}$ as zero
    repeat
      Select a power-gateable window pw ∈ PW(tf, c) ˆ pw ∉
      SPW(tf, c) and compute the energy saving by
        $E_{saving}(M0) = P_{leak}^{sys} \times T_{pgc}^{\Delta}(M_0) +$
        $\Sigma_{c \in C} [T_{epw}(M_0) \times P_{leak}(c) -$
        $N_{epw}(M_0) \times E_{pgo}(C)] - N_{ppg}(M_0) \times$
        $E_{dyn}^{ppg}$
      if $E'_{saving} > E_{saving}$ then
        Update energy saving $E_{saving}$ by $E'_{saving}$
        Add pw into SPW(tf, c)
    until the $E_{saving}$ is maximal;
    foreach selected power-gateable window spw ∈ SPW(M, c) do
      Place a predicated power-on and a predicated power-off
      instruction in the beginning and ending of spw,
      respectively.

---

In algorithm 2, to construct sliced time of a region, a first-come-first-serve (FCFS) scheduling of all thread fragments with the estimated execution time EET ( ) is performed. With the scheduling result, all time stamps of events are logged, such as the start of a thread fragment and the end The algorithm progressively selects power-gateable windows that benefit on energy into selected power-gateable windows. Finally, predicated power-gating instructions are inserted in the proper locations of the selected power-gateable windows.

Figure 5B:
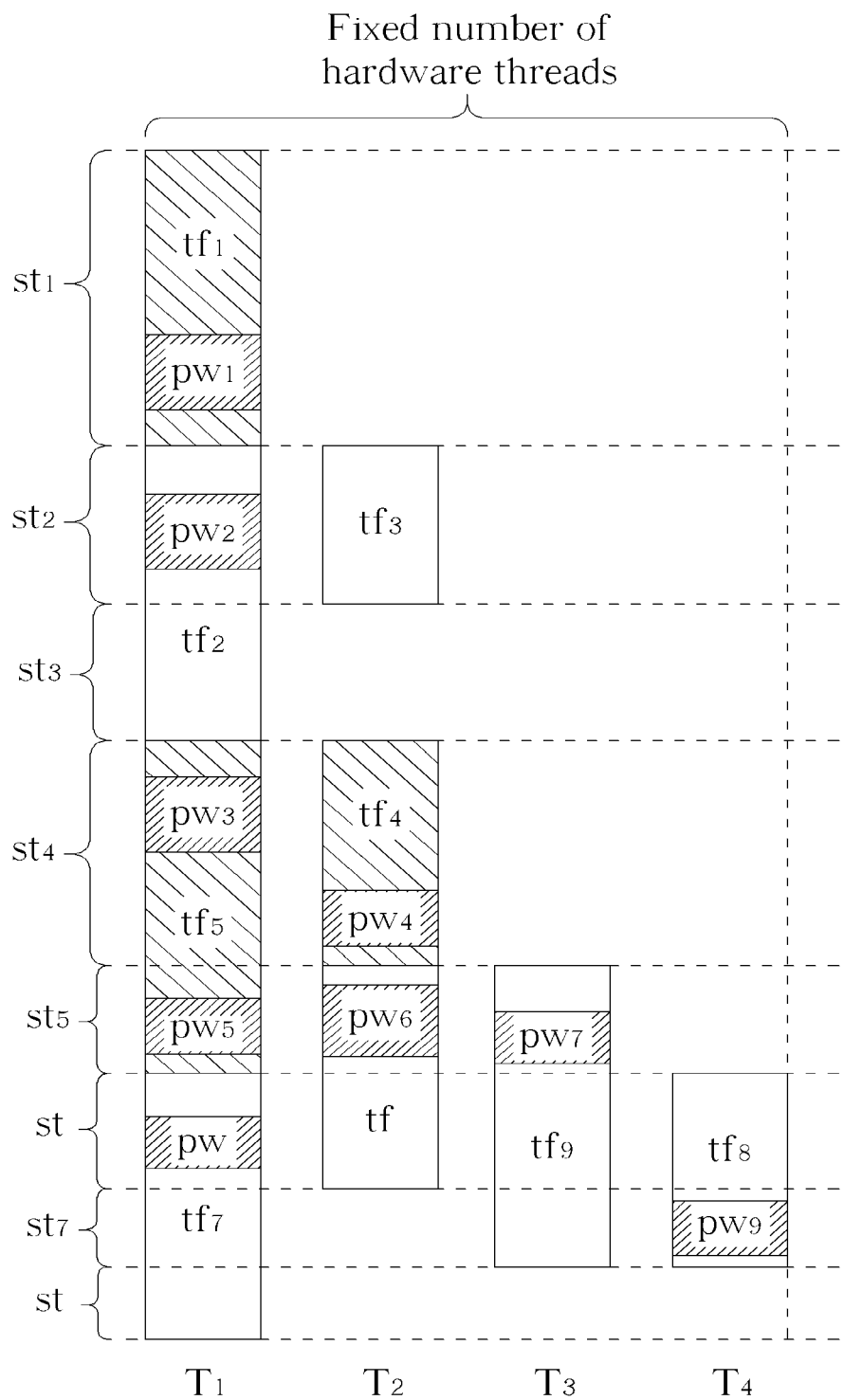

FIG. 5 shows an example for sliced time, where nine thread fragments and a component c. FIG. 5A illustrates the original example TFG. FIG. 5B shows the scheduling result for the original TFG with FCFS policy and its sliced times. FIG. 5C shows the probability of the component c being turned off for the time slice. FIG. 5D shows the estimated execution time for each sliced time, respectively. FIG. 5E shows the estimated execution time and estimated power-gating time for the MHP region M.

Figure 6:
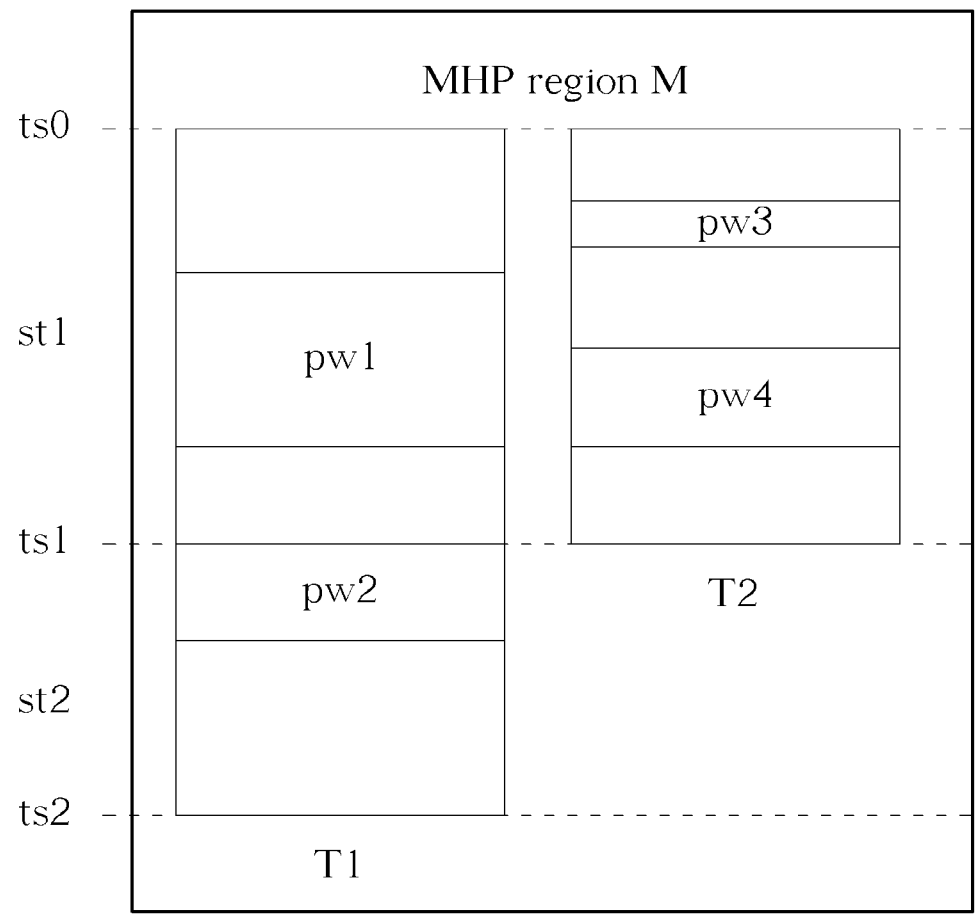
FIG. 6 illustrates a running example.

A running example of the method using FIG. 6 is now given as follows.

A multithread program comprises a series of may-happen-in-parallel regions

The algorithm is demonstrated with a single MHP region M in a system with one power-gating candidate (c) and two concurrent thread (T1 and T2)

A set of power-gateable windows for the region PW(M) is given

Estimated execution time EET( ) of each thread and estimated power-gating time EPT( ) of each power-gateable window are given from component activity data-flow analysis, CADFA Estimated execution time for estimating difference of execution time is given The number of effective power-gating window is estimated by average power-gateable windows of each thread $N_{epw}(M,c) = \Sigma_{t\ in\ M} |SPW(M,c) \cap PW(t,c)|/|M|$ Given Parameters The system leakage power $P_{sysleak}$ is 6 (unit of power)

The leakage power of the component $P_{leak}(c)$ is 5 (unit of power)

The energy to turn-off and turn-on the component $E_{pgo}(c)$ is 3 (unit of energy)

The energy to execute a predicated power-gating instruction $E_{ppgdyn}$ is 0.8 (unit of energy)

A set of power-gateable window PM(M, c)

PM(M, c)={pw1, pw2, pw3, pw4}

The estimated power-gating time of each power gateable window

EPT(pw1)=30 (unit of time)

EPT(pw2)=15

EPT(pw3)=3

EPT(pw4)=21

The estimated execution time of threads:

EET(T1)=100

EET(T2)=60

Preparing Stage

Construct time stamps:

TS(M)=(ts0, ts1, ts2)

By time stamps, slices execution time into sliced time window:

ST(M)={st1, st2}

EET(st1)=60

EET(st2)=40

Sort all power-gateable window by EPT in a list:

LPW (M,c)=(pw1, pw4, pw2, pw3)

Select the longest power-gateable window for each thread as seeds to be estimated SPW'(M, c)={pw1, pw4}

Iteration 1

Estimate difference of execution time with certain method and get ΔT

ΔT=−4

Probability to turn off component c

P(T1)=EPT(pw1)/EET(T1)=30/100=0.3

P(T2)=EPT(pw4)/EET(T2)=21/60=0.35

P(ts1)=P(T1)*T(T2)=0.105

Estimated power-gating time $T_{epw}(st1)$=EET(st1)×P(st1)=60×0.105=6.3

$T_{epw}(st2)$=EET(st2)×P(st2)=40×0.3=12

$T_{epw}(M)=T_{epw}(st1)+T_{epw}(st2)$=18.3

Number of effective power-gating window $N_{epw}(M)$=1

Number of predicated power-gating instructions $N_{ppg}(M)$=2×|SPW'(M,c)|=2×2=4

Estimated energy consumption of the MHP region M $E'_{saving}(M) = \Delta T(M) \times P_{sysleak} + T_{epw}(M,c) \times P_{leak}(c) - N_{epw}(M,c) \times E_{pgo}(c) - N_{ppg} \times E_{dynppg}$ =−4×6+18.3×5−1×3− 4×0.8=61.3

When $E'_{saving}$ is positive, it means that we can gain energy saving from power-gating pw1 and pw2

$E_{saving}$ would be zero in the first iteration for checking if $E'_{saving}$ is positive Update $E_{saving}$ and SPW $E_{saving}=E'_{saving}$=61.3

SPW=SPW'={pw1, pw4}

Select a power-gateable window in LPW and update SPW' for next iteration

Select pw2

SPW'=SPW ∪ {pw2}={pw1, pw2, pw4}

Iteration 2

Estimate difference of execution time with certain method and get ΔT

ΔT=−7

Probability to turn off component c

P(T1)=EPT(pw1)/EET(T1)=45/100=0.45

P(T2)=EPT(pw4)/EET(T2)=21/60=0.35

P(ts1)=P(T1)*T(T2)=0.1575

Estimated power-gating time $T_{epw}(st1)$=EET(st1)×P(st1)=60×0.1575=9.45

$T_{epw}(st2)$=EET(st2)×P(st2)=40×0.45=18

$T_{epw}(M)=T_{epw}(st1)+T_{epw}(st2)$=27.45

Number of effective power-gating window $N_{epw}(M)$=1.5

Number of predicated power-gating instructions $N_{ppg}(M)$=2×|SPW'(M,c)|=2×3=6

Estimated energy consumption of the MHP region M $E'_{saving}(M) = \Delta T(M) \times P_{sysleak} + T_{epw}(M,c) \times P_{leak}(c) - N_{epw}(M,c) \times E_{pgo}(c) - N_{ppg} \times E_{dynppg}$ =−7×6+27.45×5−1.5× 3−6×0.8=85.95

Since E'saving is greater than E'saving, update $E_{saving}$ and SPW $E_{saving}=E'_{saving}$=61.3

SPW=SPW'={pw1, pw2, pw4}

Select a power-gateable window in LPW and update SPW' for next iteration

Select pw3

SPW'=SPW ∪ {pw3}={pw1, pw2, pw3, pw4}

Iteration 3

Estimate difference of execution time with certain method and get ΔT

ΔT=−8

Probability to turn off component c

P(T1)=EPT(pw1)/EET(T1)=45/100=0.45

P(T2)=EPT(pw4)/EET(T2)=24/60=0.4

P(ts1)=P(T1)*T(T2)=0.18

Estimated power-gating time
  $T_{epw}(st1) = EET(st1) \times P(st1) = 60 \times 0.18 = 10.8$
  $T_{epw}(st2) = EET(st2) \times P(st2) = 40 \times 0.45 = 18$
  $T_{epw}(M) = T_{epw}(st1) + T_{epw}(st2) = 28.8$
Number of effective power-gating window
  $N_{epw}(M) = 2$
Number of predicated power-gating instructions
  $N_{ppg}(M) = 2 \times |SPW'(M,c)| = 2 \times 4 = 8$
Estimated energy consumption of the MHP region M
  $E'_{saving}(M) = \Delta T(M) \times P_{sysleak} + T_{epw}(M,c) \times P_{leak}(c) - N_{epw}(M,c) \times E_{pgo}(c) - N_{ppg} \times E_{dynppg} = -8 \times 6 + 28.8 \times 5 - 2 \times 3 - 8 \times 0.8 = 83.6$
Since $E'_{saving}$ is less than $E_{saving}$, keep the original $E_{saving}$
At the end of the algorithm, three power-gateable windows are selected
  $SPW(M,c) = \{pw1, pw2, pw4\}$
The estimated maximal power-saving is 85.95 (unit of energy)

In summary, power-gating reduces leakage energy when a component of a system is in idle state. Compiler analysis for power-gating in multithread programs suffers from concurrent-execution issues, which makes traditional power-gating analysis incapable to know how the component would be used at runtime. This paper presents a multithread power-gating framework comprising a multithread power-gating power model and a probabilistic time-slice based multithread power-gating algorithm for reducing the leakage energy when executing multithread programs on simultaneous multithreading (SMT) machines. The framework estimates the energy usage of multithread programs with aid of profitability computation and inserts into the code, with the compiler, predicated-power-gating instructions as power controls for energy management. Compared to previous work, the method applies power control in multithread programs to the whole program of a concurrent thread region while the previous work only considers the head and tail of a concurrent region.

A probabilistic framework for compiler optimization with multithread power-gating controls in multithread programs has been disclosed. As a result of multithread time slice analysis, the compiler inserts instructions into the code to turn a component on and off to reduce energy consumption during code execution. It has also presented a predicated power-gating controller design for predicated power-gating mechanism.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating power-gateable computer code executed on a device having a component, the method comprising:
  scheduling all may-happen-in parallel thread fragments of a multithread computer code with the estimated execution time;
  logging all time stamps of events including starting time and ending time of each thread fragment according to their estimated execution time to form a plurality of X logged time stamps;
  sorting the logged time stamps in the plurality of X logged time stamps;
  constructing one time slice for each pair of adjacent logged time stamps in the plurality of X logged time stamps after sorting the logged time stamps in the plurality of X logged time stamps, each time slice including all thread fragments estimated to be executing during the time slice, at least one thread fragment beginning in one time slice and ending in a different time slice;
  determining a power-gating time having a probability that the component is turned off for each time slice;
  computing the power-gating time for a specific time slice as a product of probability that the component will be turned off, for each thread executing during the specific time slice, during the specific time slice and duration of the specific time slice, wherein the probability of the component to be turned-off is computed as a series production of all the individual probabilities of each thread executing during the specific time slice to turn-off the component for said each thread;
  determining a difference, for each time slice, between the combination of dynamic and leakage power consumption for the power-gating time having no power-gating control adapted and the power-gating time having power-gating control adapted;
  selecting power-gateable windows that reduce energy consumption of the each time slice according to the difference; and
  inserting, with a complier, predicated power-gating instructions at locations corresponding to the selected power-gateable windows into the power-gateable computer code.

2. The method of claim 1 further comprising including all thread fragments estimated to be executing during a specific time slice when determining the power-gating time having the component turned off for the specific time slice.

3. The method of claim 1 further comprising turning the component on or turning the component off according to the predicated power-gating instructions.

4. The method of claim 1 further comprising estimating the energy consumption of the each time slice by estimated duration of the each slice, number of inserted predicated-power-gating instructions, estimated power-gating duration, and estimated power-gating overhead energy.

5. The method of claim 1 wherein the estimated start time of at least one thread fragment is in a different time slice than is the estimated stop time of the at least one thread fragment.

6. The method of claim 1, wherein dynamic and leakage power consumption for the power-gating time having power-gating control adapted includes energy consumed from switching the component on and off.

7. A method of power-gating a device having a component, the method comprising:
  scheduling all thread fragments of a multithread computer code with the estimated execution time;
  logging all time stamps of events including the start of each thread fragment and the end of each thread fragment according to their estimated execution time to form a plurality of X logged time stamps;
  sorting the logged time stamps in the plurality of X logged time stamps;
  constructing one time slice for each pair of adjacent logged time stamps in the plurality of X logged time stamps, each time slice including all thread fragments estimated to be executing during the time slice, at least one thread fragment beginning in one time slice and ending in a different time slice;
  determining at least one power-gating time having the probability of the component being turned off for each time slice;

computing the power-gating time for a specific time slice as a product of probability that the component will be turned off, for each thread executing during the specific time slice, during the specific time slice and duration of the specific time slice, wherein the probability of the component to be turned-off is computed as a series production of all the individual probabilities of each thread executing during the specific time slice to turn-off the component for said each thread;

determining a difference, for each time slice, between the combination of dynamic and leakage power consumption for the power-gating time having no power-gating control adapted and the power-gating time having power-gating control adapted;

selecting at least one power-gateable window that reduces energy consumption of each time slice according to the at least one difference;

inserting, with a complier, predicated power-gating instructions at locations corresponding to the selected power-gateable window into the multithread computer code to generate power-gateable computer code; and executing the power-gateable computer code with the device.

8. The method of claim 7 further comprising turning the component on or turning the component off according to the predicated power-gating instructions.

9. The method of claim 7 further comprising estimating the energy consumption of the time slice by estimated duration of the time slice, number of inserted predicated-power-gating instructions within the time slice, estimated power-gating duration, and estimated power-gating overhead energy.

* * * * *

UNITED STATES PATENT AND TRADEMARK OFFICE
CERTIFICATE OF CORRECTION

| | | |
|---|---|---|
| PATENT NO. | : 11,112,845 B2 | Page 1 of 1 |
| APPLICATION NO. | : 14/964592 | |
| DATED | : September 7, 2021 | |
| INVENTOR(S) | : Wen-Li Shih et al. | |

It is certified that error appears in the above-identified patent and that said Letters Patent is hereby corrected as shown below:

On the Title Page

Item [73], correct "MFDIATEK INC." to --MEDIATEK INC.--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*